United States Patent
Lent et al.

(10) Patent No.: US 7,512,832 B1
(45) Date of Patent: *Mar. 31, 2009

(54) SYSTEM AND METHOD FOR TRANSPORT-LEVEL FAILOVER OF FCP DEVICES IN A CLUSTER

(75) Inventors: Arthur F. Lent, Cambridge, MA (US); Vijayan Rajan, Sunnyvale, CA (US); Mohan Srinivasan, Santa Clara, CA (US); Herman Lee, Mountain View, CA (US); Brian Pawlowski, Palo Alto, CA (US)

(73) Assignee: Network Appliance, Inc., San Jose, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 11/837,350

(22) Filed: Aug. 10, 2007

Related U.S. Application Data

(63) Continuation of application No. 10/421,297, filed on Apr. 23, 2003, now Pat. No. 7,260,737.

(51) Int. Cl.
*G06F 11/00* (2006.01)

(52) U.S. Cl. .......................................... 714/4
(58) Field of Classification Search ................ 714/4
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,781,770 A | 7/1998 | Byers et al. | |
| 5,790,775 A | 8/1998 | Marks et al. | |
| 5,802,366 A | 9/1998 | Row et al. | |
| 5,812,748 A | 9/1998 | Ohran et al. | |
| 5,812,751 A | 9/1998 | Ekrot et al. | |
| 5,812,754 A | 9/1998 | Lui et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,951,695 A | 9/1999 | Kolovson | |
| 5,963,962 A | 10/1999 | Hitz et al. | |
| 6,038,570 A | 3/2000 | Hitz et al. | |
| 6,065,037 A | 5/2000 | Hitz et al. | |

(Continued)

OTHER PUBLICATIONS

U.S. Appl. No. 10/027,020, Joydeep Sen Sarma et al.

(Continued)

*Primary Examiner*—Bryce P Bonzo
(74) *Attorney, Agent, or Firm*—Cesari and McKenna LLP

(57) ABSTRACT

A system and method for clustered failover of storage appliances is provided. In the event of a failover of one storage appliance to a surviving storage appliance, the surviving storage appliance assumes the identity of the failed storage appliance. This assumption of the identifier is accomplished by initializing a Fibre Channel Host Bus Adapter on the surviving storage appliance with the NodeName and PortNames of the failed storage appliance.

35 Claims, 5 Drawing Sheets

U.S. PATENT DOCUMENTS

| | | | |
|---|---|---|---|
| 6,119,244 | A | 9/2000 | Schoenthal et al. |
| 6,138,126 | A | 10/2000 | Hitz et al. |
| 6,289,356 | B1 | 9/2001 | Hitz et al. |
| 6,292,905 | B1 | 9/2001 | Wallach et al. |
| 6,330,687 | B1 | 12/2001 | Griffith |
| 6,425,035 | B2 | 7/2002 | Hoese et al. |
| 6,578,158 | B1 | 6/2003 | Deitz et al. |
| 6,625,747 | B1 | 9/2003 | Tawil et al. |
| 6,625,749 | B1 | 9/2003 | Quach |
| 6,681,339 | B2 | 1/2004 | McKean et al. |
| 6,715,098 | B2 | 3/2004 | Chen et al. |
| 6,728,897 | B1 | 4/2004 | Cramer et al. |
| 6,775,702 | B2 | 8/2004 | Oeda et al. |
| 2002/0112022 | A1 | 8/2002 | Kazar et al. |
| 2002/0116593 | A1 | 8/2002 | Kazar et al. |
| 2002/0188711 | A1 | 12/2002 | Meyer et al. |
| 2003/0028587 | A1 | 2/2003 | Driscoll et al. |
| 2003/0088735 | A1 | 5/2003 | Busser et al. |

OTHER PUBLICATIONS

U.S. Appl. No. 10/216,453, Vijayan Rajan et al.
U.S. Appl. No. 10/215,917, Brian Pawlowski et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
NCI TS 332-1999 Fibre Channel Arbitrated Loop (FC-AL-2) published by the American National Standards Institute.
ANSI X3.230-1994, Fibre Channel Physical and Signaling Interface (FC-PH).
Information Technology—Fibre Channel Protocol for SCSI, Second Version (FCP-2), Nov. 1, 2001.
Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.
U.S. Appl. No. 10/421,297, filed Apr. 23, 2003 by Arthur F. Lent et al. for a System and Method for Transport-Level Failover of FCP Devices in a Cluster, all pages.
Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

SYSTEM AND METHOD FOR TRANSPORT-LEVEL FAILOVER OF FCP DEVICES IN A CLUSTER

RELATED APPLICATIONS

This application is a continuation of U.S. Ser. No. 10/421,297, filed by Arthur F. Lent et al. Apr. 23, 2003.

FIELD OF THE INVENTION

The present invention relates to clustered storage systems and, in particular, to clustered failover of storage systems utilizing a block access protocol, such as the FCP protocol.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by storage system, such as a filer to be available for access to the greatest degree possible. Accordingly, some computer storage systems provide a plurality of file servers (or filers) in a cluster, with a property that when a first filer fails, the second filer is available to take over and provide the services and the data otherwise provided by the first filer. When a first filer fails, the second filer in a cluster should assume the task of processing and handling any data access requests normally processed by the first filer. One such example of a cluster configuration is described in U.S. patent application Ser. No. 09/625,234 entitled NEGOTIATING TAKEOVER IN HIGH AVAILABILITY CLUSTER by Samuel M. Cramer, et al., the contents of which are hereby incorporated by reference. Additionally, an administrator may desire to take a filer offline for a variety of reasons, for example, to upgrade hardware, etc. In such situations, it may be advantageous to perform a user-initiated takeover operation, as opposed to a failover operation. After the takeover operation is complete, the filer's data will be serviced by its partner until a giveback operation is performed.

In certain known filer server cluster implementations, the transport medium is Ethernet cabling utilizing the TCP/IP protocol for transport of data. Various file service protocols can execute on top of the TCP/IP protocol. In known failover techniques involving clusters of file server, Network Interface Controllers (NIC) contain the capabilities to support multiple Media Address Control (MAC) addresses. When one of filer servers in a cluster detects a failure of its partner filer server, for example, by sensing the partner file server is no longer emitting a heart beat signal, the surviving file server proceeds to take over the partner's disks. The surviving file server then executes a failover script, which involves obtaining the IP address of the failed file server and determining each MAC address associated with the failed file server. Each NIC of the surviving filer is then assigned a MAC address that is normally associated with a NIC of the failed file server. Thus, transfers with IP addresses, which are mapped to search a MAC address of the failed filer, are no longer routed to the failed filer, but instead are directed to the surviving partner file server.

However, because certain block access protocols, such as FCP do not utilize TCP/IP addresses, known failover techniques will not function in a cluster using FCP. It is thus an object of the present invention to provide a system and method for transport-level failover of FCP devices.

SUMMARY OF THE INVENTION

This invention overcomes the disadvantages of the prior art by providing a system and method for transport-level failover of FCP devices, such as storage systems, in a cluster operating in a Fibre Channel (FC) network. The cluster comprises a plurality of storage systems embodied as multi-protocol storage appliances interconnected by a cluster interconnect device. Each storage appliance is coupled to a plurality of disks. Upon failure of one of the storage appliances, the surviving storage appliance assumes the identity of the failed storage appliance by activating a Fibre Channel (FC) Host Bus Adapter (HBA) and assigning a Node Name and Port Name that were previously assigned to the failed storage appliance to its HBA.

Specifically, upon detecting a failure of one of the storage appliances in the cluster, the surviving storage appliance takes ownership of the disks that were owned by the failed storage appliance. Alternately, a user may initiate a takeover operation directed to a storage appliance in a cluster configuration. The surviving storage appliance then activates an additional FC port, either by activating an additional HBA or by using a multi-port HBA. This additional port is assigned a Node Name of the failed storage appliance. Once the newly activated port has been initialized with the Node Name of the failed storage appliance, the port is then activated with the Port Names of the failed storage appliance. After the additional port has been associated with the port names of the failed storage appliance, block access (FCP) requests that were originally directed to the failed storage appliance are directed to the surviving storage appliance. To other FCP devices on the FC network, it will appear as if the failed storage appliance was momentarily disconnected from the network.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
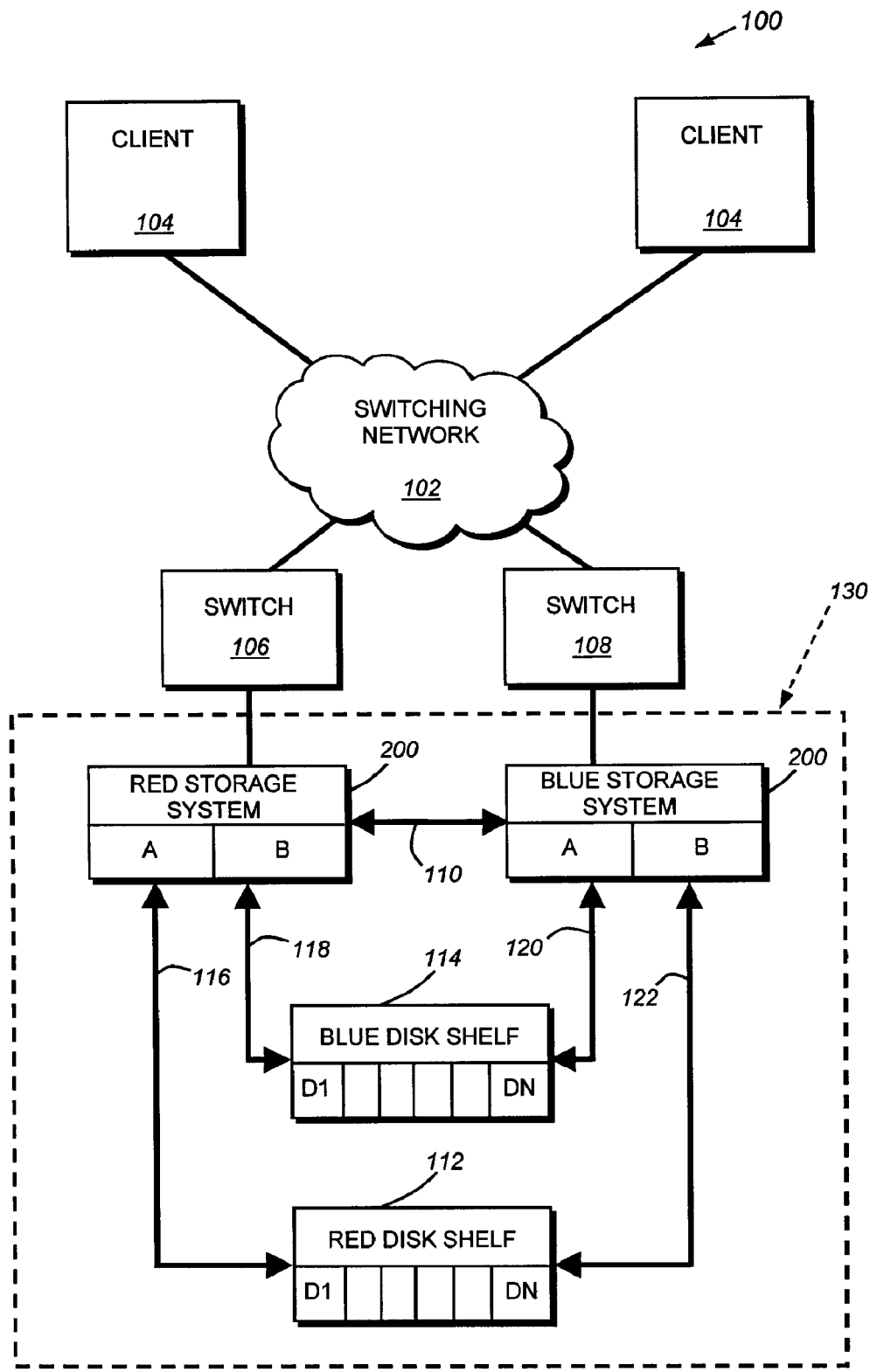
FIG. 1 is a schematic block diagram of a storage system cluster environment in accordance with an embodiment of the present invention.

FIG. 1 is a schematic block diagram of an exemplary network environment 100 in which the principles of the present invention are implemented. The network 100 is based around a network cloud 102 configured as, e.g., a Fibre Channel (FC) switching network. FC is a set of related standards defining a transport service for a variety of data access protocols. Attached to the network cloud are a number of switches, 106 and 108, which connect to FCP devices, such as Red storage system and Blue storage system 200. A number of clients 104 are also interconnected with the network cloud.

A client 104 may be a general-purpose computer, such as a PC or a workstation, or a special-purpose computer, such as an application server, configured to execute applications over an operating system that includes block access protocols. Red storage system and Blue storage system 200 are connected as two nodes of a storage system cluster 130. These storage system, described further below, are storage appliances configured to control storage of and access to, interconnected storage devices. Each of the devices attached to the switching network 102 includes an appropriate conventional network interface arrangement (not shown) for communicating over the switching network 102, or through the switches 106 and 108, using a set of desired block access protocols such as Small Computer System Interface (SCSI) encapsulated over Fibre Channel (FCP).

In the illustrated example, Red storage system is connected to Red Disk Shelf 112 by data access loop 116. It should be noted that such a data access loop can be any acceptable networking media including, for example, a Fibre Channel Arbitrated Loop (FCAL). Fibre Channel is a set of related protocols that define a transport service for a variety of data access protocols. Similarly, the Red storage system accesses Blue Disk Shelf 114 via counterpart data access loop 118. Likewise, Blue storage system accesses Blue Disk Shelf 114 via data access loop 120 and Red Disk Shelf 112 through counterpart data access loop 122. It should be noted that while the Red and Blue disk shelves are shown directly connected to storage system 200 for illustrative purposes only, the disk shelves and storage systems may be operatively interconnected in any suitable FC switching network topology. During normal cluster operation, the storage system that is connected to a disk shelf via the disk shelf's A loop is the "owner" of the disk shelf and is primarily responsible for servicing data requests directed to blocks on volumes contained on that disk shelf. Thus, in this example, the Red storage system would own the Red Disk Shelf 112 and be primarily responsible for servicing data access requests for blocks contained on that disk shelf. Similarly, the Blue storage system would be primarily responsible for the Blue disk shelf 114. When operating as a storage system cluster, each storage system is designed to take over and assume data handling capabilities for the other disk shelf in the cluster 130.

Connecting the Red and Blue storage systems is a cluster interconnect 110, which provides a direct communication link between the two storage systems. The cluster interconnect can be of any suitable communication medium, including, for example, an Ethernet connection.

B. Storage Appliance

Figure 2:
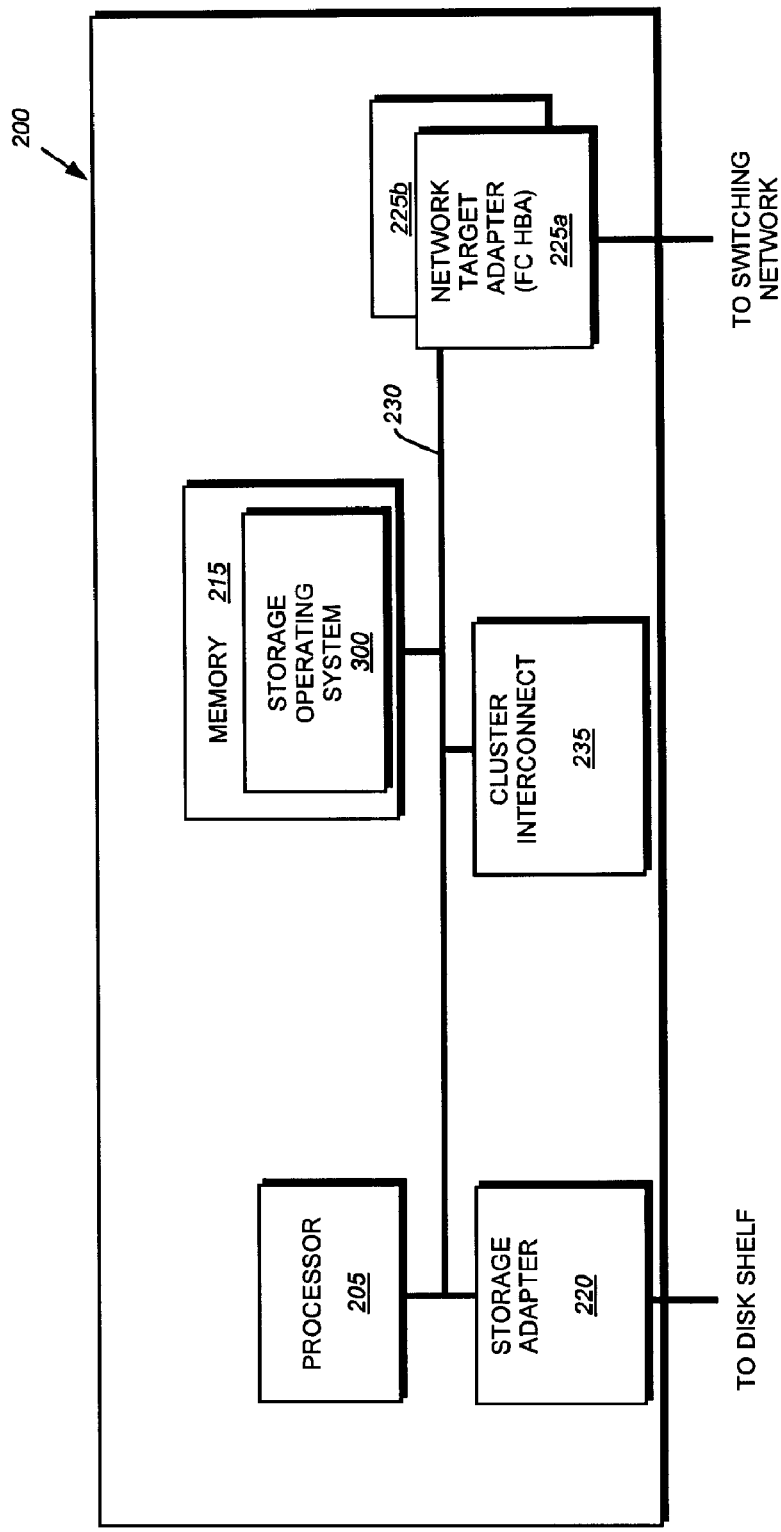
FIG. 2 is a more-detailed schematic block diagram of an exemplary storage appliance in accordance with FIG. 1.

FIG. 2 is a schematic block diagram of a storage system 200 as used in cluster environment 100 configured to provide storage service relating to the organization of information on storage devices, such as disks. The storage system 200 is illustratively embodied as a multi-protocol storage appliance comprising a processor 205, a memory 215, a plurality of network adapters 225a, 225b and a storage adapter 220 interconnected by a system bus 230. A multi-protocol storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Multi-protocol storage appliances are further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the teachings of which are hereby incorporated by reference. The terms "storage system" and "storage appliance" are thus used interchangeably. The storage appliance 200 also includes a storage operating system 300 that provides a virtualization function to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of logical unit numbers (luns) or vdisk objects. A vdisk object (hereinafter "vdisk") is a special file type that is implemented by the virtualization function and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al., the contents of which are incorporated herein by reference. The multi-protocol storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet) or a shared local area network (LAN) or any other acceptable networking architecture.

The network adapters 225a, b also couple the storage appliance 200 to a plurality of clients 104 that may be further configured to access the stored information as blocks or disks. For this SAN-based network environment, the storage appliance is coupled to an illustrative Fibre Channel (FC) switching network 102. The network adapters 225 may comprise a FC host bus adapter (HBA) having the mechanical, electrical and signaling circuitry needed to connect the storage appliance 200 to a SAN network switch, such as a conventional FC switch. In addition to providing FC access, the FC HBA may offload Fibre Channel network processing operations from the storage appliance's processor.

The clients may be general-purpose computers configured to execute applications over a variety of operating systems, including the UNIX® and Microsoft® Windows™ operating systems.

The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol.

In accordance with the FC protocol, initiators and targets have three unique identifiers, a Node Name, a Port Name and a Device Identifier. The Node Name and Port Name are worldwide unique. A Device Identifier is assigned dynamically by the FC port that it is attached to and is unique within a given FC switching fabric.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

C. Storage Operating System

In the illustrative embodiment, the storage operating system is the NetApp® Data ONTAP™ operating system available from Network Appliance, Inc., Sunnyvale, California that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a or storage appliance, implement data access semantics, such as the Data ONTAP storage operating system, which is implemented as a microkernel. The storage operating system can also be implemented as an application program operating over a general-purpose operating system, such as UNIX® or Windows NT®, or as a generalpurpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
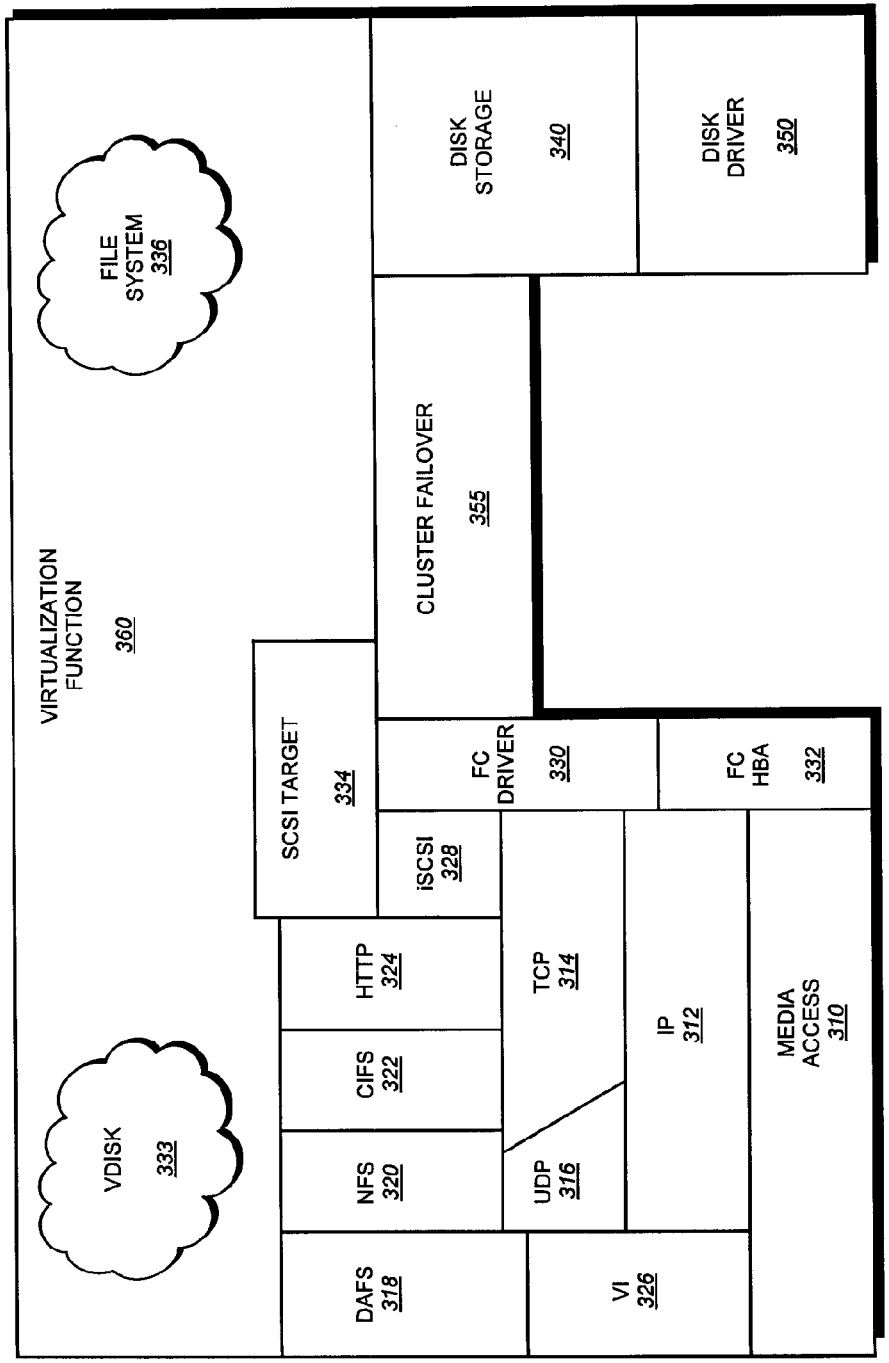
FIG. 3 is a schematic block diagram of an exemplary storage operating system for use with the exemplary storage appliance of FIG. 2 in accordance to an exemplary embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization function 360 that is implemented by a file system 336 interacting with virtualization software embodied as, e.g., vdisk code 333 and SCSI target code 334. The vdisk code 333 manages SAN deployments by, among other things, implementing a comprehensive set of vdisk (lun) commands that are converted to primitive file system operations ("primitives") that interact with the file system 336 and the SCSI target code 334 to implement the vdisks.

The SCSI target code 334, in turn, initiates emulation of a disk or lun by providing a mapping procedure that translates luns into the special vdisk file types. The SCSI target code is illustratively disposed between the FC and iSCSI drivers 328, 330 and the file system 336 to thereby provide a translation layer of the virtualization function 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (kB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

The virtualization function 360 provides a virtualized storage space that allows SAN and NAS storage objects to coexist with respect to global space management by the file system 336. To that end, the virtualization function 360 exploits the characteristics of the file system, including its inherent ability to aggregate disks and abstract them into a single pool of storage. For example, the function 360 leverages the ability of the file system 336 to organize a collection of disks into one or more volumes representing a pool of global storage space. The pool of global storage is then made available for both SAN and NAS deployments through the creation of vdisks and files, respectively. In addition to sharing the same global storage space, the vdisks and files share the same pool of available storage from which to draw on when expanding the SAN and/or NAS deployments.

The virtualization function 360 further provides reliability guarantees for those SAN and NAS storage objects coexisting in the global storage space of storage appliance 200. As noted, the file system 336 organizes information as file, directory and vdisk objects within volumes of disks. Underlying each volume 150 is a collection of RAID groups that provide protection and reliability against disk failure(s) within the volume. The information serviced by the multi-protocol storage appliance is protected according to an illustrative RAID 4 configuration. This level of protection may be extended to include, e.g., synchronous mirroring on the appliance platform. A vdisk 322 created on a volume that is protected by RAID 4 "inherits" the added protection of synchronous mirroring if that latter protection is specified for the volume. In this case, the synchronous mirroring protection is not a property of the vdisk but rather a property of the underlying volume and the reliability guarantees of the file system 336. This "inheritance" feature of the storage appliance simplifies management of a vdisk because a system administrator does not have to deal with reliability issues.

The storage operating system 300 further includes, in the illustrative embodiment, a cluster failover layer 355 that implements various failover features including initiating a failover. The cluster failover layer 355, in the illustrative embodiment, monitors the cluster interconnect for heartbeat signals.

D. FCP Failover

Each device attached to a FC network has a World Wide Node Name (WWNN) that is unique. In the illustrative embodiments, these WWNNs are 64-bit values. Each FC device also has one or more ports associated with it. Each port has a World Wide Port Name, which is, similarly, a 64-bit value in the illustrative embodiment. Each device is, thus, uniquely identified by a Node Name and one or more Port Names.

Figure 4:
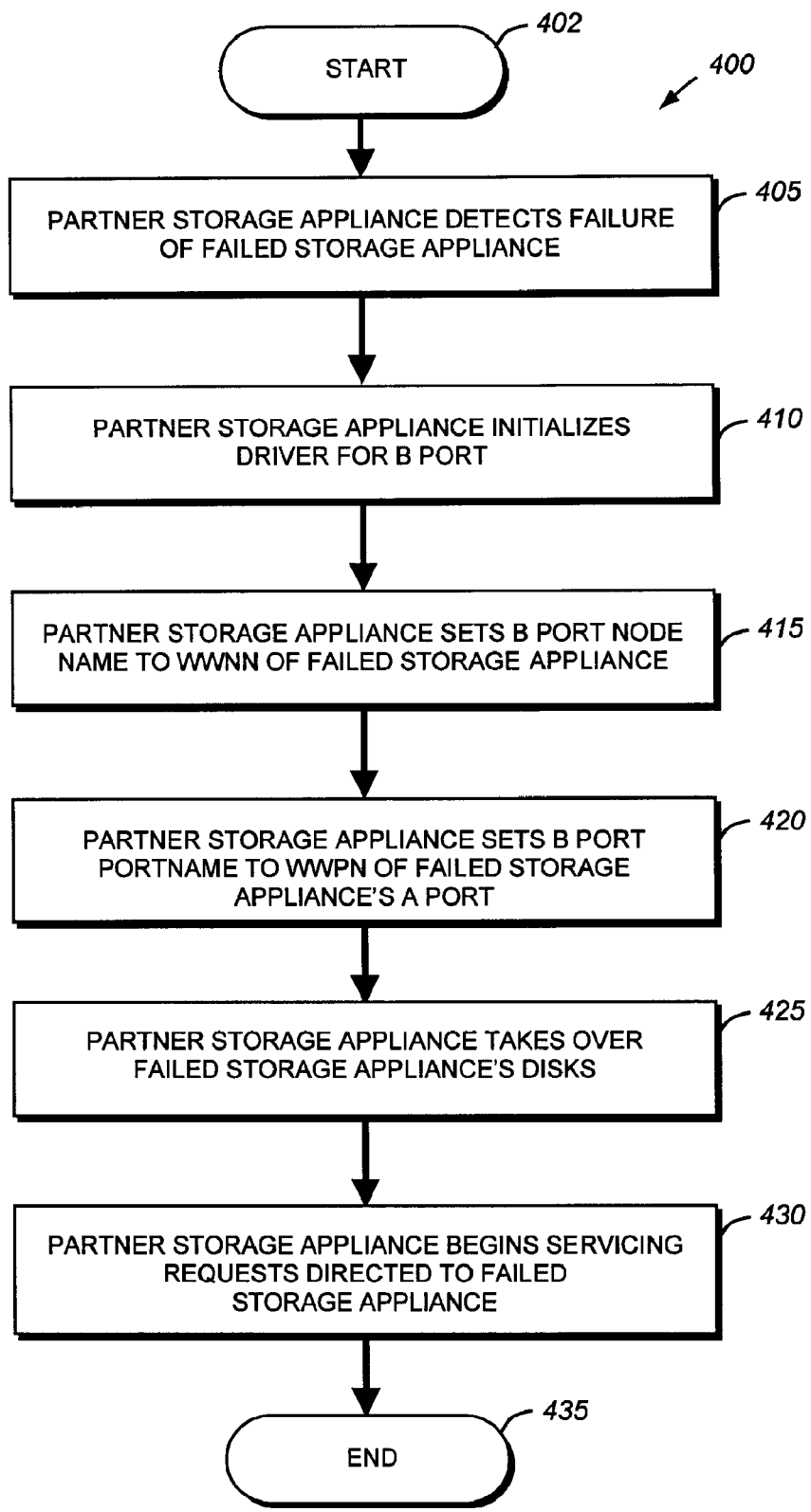
FIG. 4 is a flow chart of a procedure performed by a surviving storage appliance in taking over a failed storage appliance's identity in accordance with an embodiment of the invention.

A flowchart of a procedure 400, according to an illustrative embodiment of the present invention, for failover of FCP devices in a cluster is shown in FIG. 4. The procedure starts in step 402 and proceeds to, in step 405, where the partner storage appliance detects a failure or other error condition in the failed storage appliance. In alternative embodiments, an administrator can initiate a failover procedure (or a takeover), for example, during scheduled maintenance on a storage appliance. In response, the partner storage appliance, in step 410, initializes its driver for its B port. This can be accomplished by, for example, creating a new instance of FC HBA layer 332 (FIG. 3). The partner storage appliance then sets the Node Name of Port B equal to the World Wide Node Name of the failed storage appliance (step 415). Next, the partner storage appliance sets Port B's Port Name equal to the World Wide Port Name of the failed storage appliance's Port A in step 420. At this point in time, Port B on the partner storage appliance is configured exactly as if it was Port A on the failed storage appliance.

Once the ports have been initialized with the appropriate names, then the partner storage appliance takes over the disks of the failed storage appliance (step 425). This disk takeover can be accomplished using conventional disk ownership routines. One such routine is described in U.S. patent application Ser. No. 10/027,020, entitled SYSTEM AND METHOD FOR TRANSFERRING VOLUME OWNERSHIP IN NETWORKED STORAGE, by Joydeep Sen Sarma, et al., the teachings of which are hereby incorporated by reference. Once the partner storage appliance has obtained control of the disks, the partner file begins servicing requests directed to the failed storage appliance (step 430). As Port B of the partner storage appliance appears to other devices on the FC switching network to be Port A of the failed storage appliance, data access requests normally directed to the failed storage appliance's Port A will be directed to the partner storage appliance's Port B. The procedure then ends at step 435.

Figure 5:
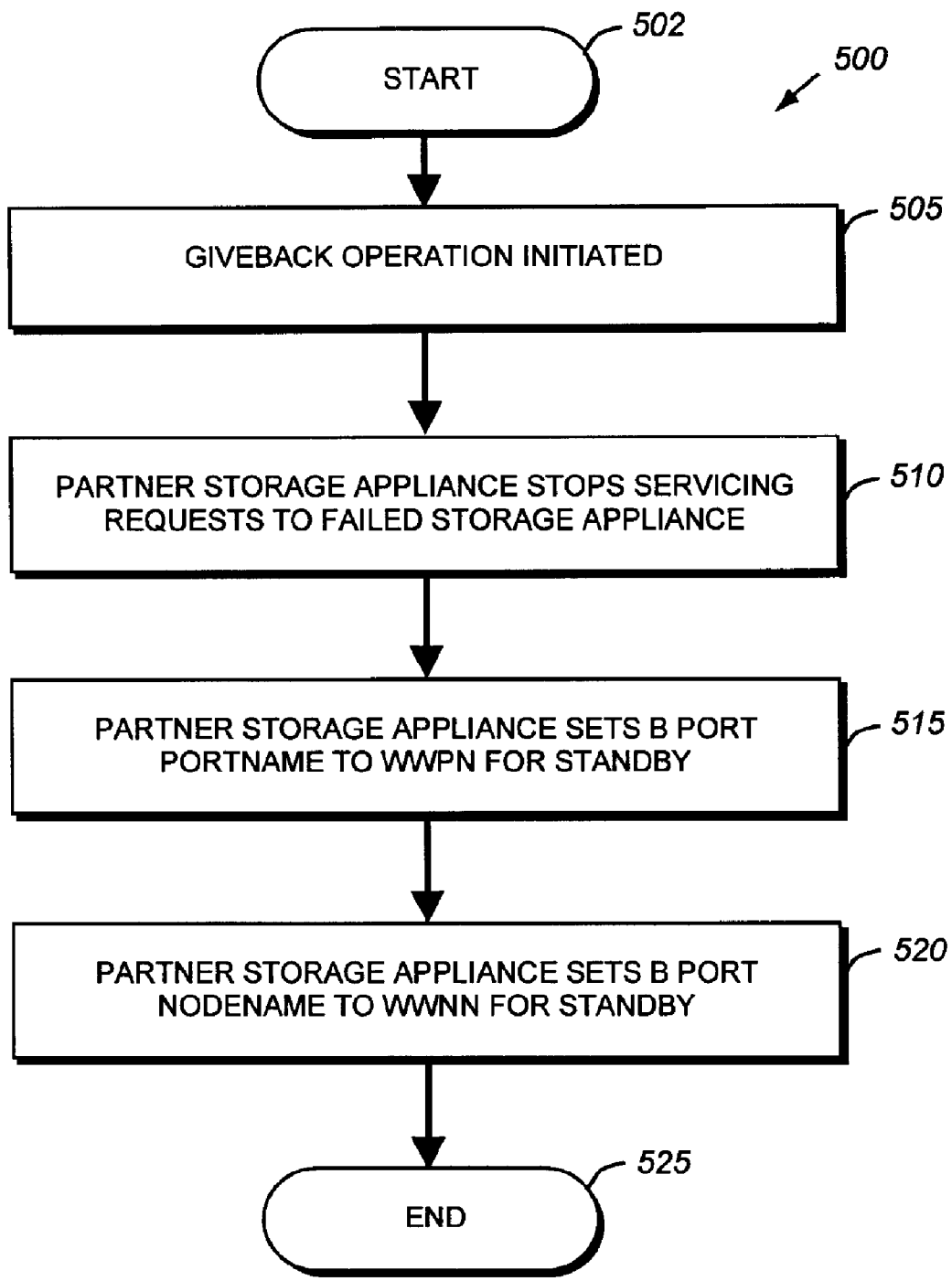
FIG. 5 is a flow chart of a procedure performed by a storage appliance in response to a give back operation.

Once the failure or other error condition has been corrected, an administrator or user may cause the partner storage appliance to execute a giveback operation to transfer control of the disks that were taken over by the partner storage appliance back to the now-functional failed storage appliance. A flowchart of an exemplary giveback procedure 500 is shown in FIG. 5. The procedure 500 begins at step 502 and proceeds to step 505, where the giveback operation is initiated. This initiation can be performed by an administrator or user of the system entering a command in, for example, a command line interface (CLI) or by selecting an option in a graphical user interface (GUI) that is operatively interconnected with the storage appliance and storage operating system. In an alternate embodiment, the recovered failed storage appliance can alert the partner storage appliance that a giveback command should be initiated. In response to the initialization of the giveback procedure, the partner storage appliance, in step 510, stops servicing requests directed to any ports that were configured in a failover procedure to handle requests previously directed to the failed storage appliance. After the partner storage appliance stops servicing requests directed to ports configured as failed storage appliance ports, the partner storage appliance then sets its Port B Port Name to a WWPN that is not associated with a Port Name of the failed storage appliance (step 515). Finally, the partner storage appliance, in step 520, sets the Port B Node Name to a WWNN that is not associated with a Node Name of the failed storage appliance. The procedure then ends at step 525.

Exemplary configurations of the Node Name and Port Name settings for the illustrative environment of FIG. 1 are shown in Tables 1-4.

TABLE 1

Red Storage appliance (Port A)

| Port A | Normal Operation | Failover |
|---|---|---|
| Node Name | RedNode | RedNode |
| Port Name | RedNodeA | RedNodeA |

TABLE 2

Red Storage appliance (Port B)

| Port B | Normal Operation | Failover |
|---|---|---|
| Node Name | UniqueNode | BlueNode |
| Port Name | UniqueB | BlueNodeA |

TABLE 3

Blue Storage appliance (Port A)

| Port A | Normal Operation | Failover |
|---|---|---|
| Node Name | BlueNode | BlueNode |
| Port Name | BlueNodeA | BlueNodeA |

TABLE 4

Blue Storage appliance (Port B)

| Port B | Normal Operation | Failover |
|---|---|---|
| Node Name | UniqueNode | RedNode |
| Port Name | UniqueB | RedNodeA |

As an example, in the exemplary environment shown in FIG. 1, the Red Storage appliance and Blue Storage appliance are configured to be each other's failover partner. In normal operation, the Red Storage appliance will have its Port A set with a Node Name having a value of RedNode, which would be a World Wide Node Name (WWNN). Similarly, the Port Name (WWPN) of Port A would be RedNodeA. In this exemplary environment, each storage appliance's B port is configured for failover operation. Thus, during a failover, the Node Name and Port Name of Port A would remain the same.

As the Red Storage appliance uses its Port B for failover support for the Blue Storage appliance, in normal operation the Red Storage appliance has a UniqueNode WWNN and a UniqueB WWPN. The UniqueNode and UniqueB values are FC network unique Node Name and PortName. In the illustrative embodiment, the Red Storage appliance will log into the FC network with its Port B as an initiator. In the event of a failover, Red Storage appliance will configure its Port B to have a Node Name of Blue-Node and a Port Name of Blue-NodeA, which are the normal values that the Blue Storage appliance assigns to its Port A. Thus, after a failover, Port B of the Red Storage appliance appears to the network as Blue Storage appliance's Port A.

Tables 3 and 4 show that Blue Storage appliance has similar Node Name and Port Name assignments. Specifically, Port A of the Blue Storage appliance has a Node Name of BlueNode and a Port Name of BlueNodeA. These WWNN and WWPN values are assumed by Port B of the Red Storage appliance in the event of a failover.

To again summarize, in the event of a failure or other error condition of a storage appliance in a cluster configuration, the surviving storage appliance assumes the identify of the failed storage appliance and begins servicing block access requests directed to the failed storage appliance. This assumption of the failed storage appliance's identity occurs by the partner storage appliance activating an additional FC HBA (or creating an additional instance of one) and assigning it a new Port Name and Node Name. The Port Name will be that of the failed storage appliance's port. Similarly, the new Node Name will correspond to that of the failed storage appliance's Node Name. Once these new values are assigned, the surviving storage appliance then takes control of the disks of the failed storage appliance and begins processing data access requests directed to the additional port. To other FC devices attached to the FC network, it appears that the failed storage appliance was momentarily unplugged from the network. However, the surviving storage appliance is masquerading as the failed storage appliance.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method, comprising:
   configuring a second device with at least two ports, wherein a first port on the second device is configured to receive requests directed to the second device;
   detecting, by the second device, a failure in a first device;
   configuring a second port on the second device with a port name and a node name of the first device;
   asserting ownership, by the second device, of a first set of storage devices originally owned by the first device; and
   servicing, by the second device, data access requests directed to either the first device or the second device.

2. The method of claim 1, wherein the failover is detected by the second device detecting a lack of a heartbeat signal from the first device.

3. The method of claim 1, wherein the failover is initiated by a user.

4. The method of claim 1, further comprising:
   storing the node name and the port name on the second device prior to failure of the first device.

5. The method of claim 1, further comprising:
   configuring the second device with a second set of storage devices, wherein the second set of storage devices are owned by the second device and used in processing requests directed to the second device.

6. The method of claim 1, wherein the first device and the second device are fibre channel protocol (FCP) devices.

7. The method of claim 1, further comprising:
   determining the first device is repaired;
   performing a giveback operation, wherein the giveback operation transfers control of the first set of storage devices from the second device to the first device;
   ceasing to service requests for the first device by the second device; and
   configuring the port name and the node name of the second port on the second device to a standby name.

8. The method of claim 7, further comprising:
   configuring a first port on the first device with the port name and the node name previously assigned to the second port of the second device; and
   processing, by the first device, requests directed to the first device by the devices.

9. The method of claim 7, wherein the giveback operation is initiated by a user.

10. The method of claim 7, wherein the giveback operation is initiated by an application.

11. A storage system, comprising:
    a second computer configured with a first port and a second port, where the first and second port are used to communicate with devices connected to the second computer over a network, and the second computer is further connected with a first set of storage devices and a second set of storage devices, wherein the second port is assigned a port name and a node name of a first computer to allow the second computer to receive and respond to requests directed to the first computer or the second computer.

12. The system of claim 11, wherein the failover is detected by the second computer detecting a lack of a heartbeat signal from the first computer.

13. The system of claim 11, wherein the failover is initiated by a user.

14. The system of claim 11, further comprising:
a data structure stored on the second computer stores the node name and the port name on the second device prior to failure of the first device.

15. The system of claim 11, wherein the first computer and the second computer are fibre channel protocol (FCP) devices.

16. A method, comprising:
configuring a second computer with a first port and a second port for communicating with devices connected over a network to the second computer, and with a first set of storage devices and a second set of storage devices, wherein the second port is assigned a port name and a node name of a first computer to allow the second computer to receive and respond to requests directed to the first computer or the second computer;
in response to the first computer coming back online, initiating a giveback operation;
ceasing to service requests for the first computer by the second computer; and
configuring the port name and the node name of the second port on the second computer to a standby name.

17. The method of claim 16, wherein the giveback operation transfers control of the first set of storage devices from the second computer to the first computer.

18. The method of claim 16, further comprising:
configuring a first port on the first computer with the port name and the node name previously assigned to the second port of the second computer; and
processing, by the first computer, requests directed to the first computer by the devices.

19. The method of claim 16, wherein the first computer is connected to the first set of storage devices and the second set of storage devices, and has a second port to allow for takeover in response to a failure of the second computer.

20. The method of claim 16, wherein initiating the giveback operation is started by a user.

21. The method of claim 16, wherein initiating the giveback operation is started by an application.

22. The method of claim 16, wherein the first computer and the second computer are fibre channel protocol (FCP) devices.

23. The method of claim 16, wherein the second computer is configured with the node name and the port name of the first computer in response to a failover of the first computer.

24. The method of claim 23, wherein the failover is detected by the second computer detecting a lack of a heartbeat signal from the first computer.

25. The method of claim 23, wherein the failover is initiated by a user.

26. A storage system, comprising:
a second computer configured with a first port and a second port, where the first and second port are used to communicate with devices connected to the second computer over a network, and the second computer is further connected with a first set of storage devices and a second set of storage devices, wherein the second port is assigned a port name and a node name of a first computer to allow the second computer to receive and respond to requests directed to the first computer or the second computer; and
in response to the first computer coming back online, a storage operating system executed on the second computer is configured to initiate a giveback operation, cease servicing requests for the first computer, and change the port name and the node name of the second port to a standby name.

27. The system of claim 26, wherein the giveback operation transfers control of the first set of storage devices from the second computer to the first computer.

28. The system of claim 26, further comprising:
a storage system on the first computer to configure a first port with the port name and the node name previously assigned to the second port of the second computer, and to process requests directed to the first computer by the devices.

29. The system of claim 28, wherein the first computer is connected to the first set of storage devices and the second set of storage devices, and has a second port to allow for takeover in response to a failure of the second computer.

30. The system of claim 26, wherein a user initiates the giveback operation.

31. The system of claim 26, wherein an application initiates the giveback operation.

32. The system of claim 26, wherein the first computer and the second computer are fibre channel protocol (FCP) devices.

33. The system of claim 26, wherein the second computer is configured with the node name and the port name of the first computer in response to a failover of the first computer.

34. The system of claim 33, wherein the failover is detected by the second computer detecting a lack of a heartbeat signal from the first computer.

35. The system of claim 33, wherein the failover is initiated by a user.

* * * * *